No. 702,519. Patented June 17, 1902.
E. M. WINFREY.
SHADE BRACKET.
(Application filed Oct. 17, 1901.)
(No Model.)
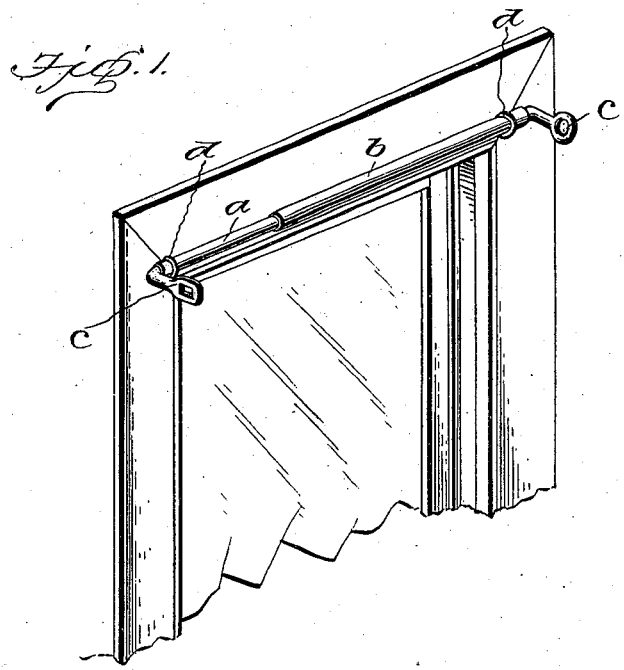
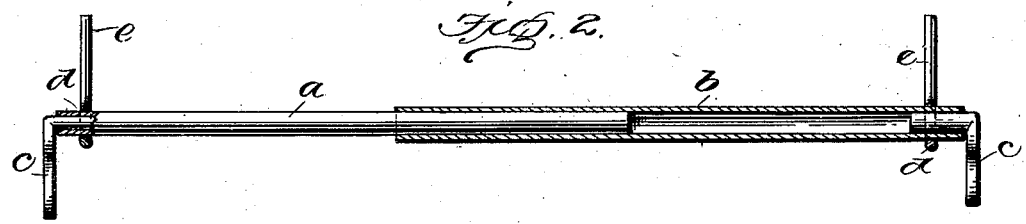
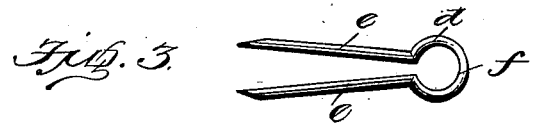
Inventor
E. M. Winfrey
Witnesses
By
Attorneys

UNITED STATES PATENT OFFICE.

EDGAR M. WINFREY, OF WICHITA FALLS, TEXAS.

SHADE-BRACKET.

SPECIFICATION forming part of Letters Patent No. 702,519, dated June 17, 1902.

Application filed October 17, 1901. Serial No. 79,017. (No model.)

*To all whom it may concern:*

Be it known that I, EDGAR M. WINFREY, a citizen of the United States, residing at Wichita Falls, in the county of Wichita and State of Texas, have invented certain new and useful Improvements in Shade-Brackets; and I do declare the following to be a full, clear, and exact description of the invention, such as will enable others skilled in the art to which it appertains to make and use the same.

The invention relates to window-shade brackets.

The object of the invention is to provide a bracket of this character which shall be simple of construction, durable in use, comparatively inexpensive of production, and which may be easily and quickly adjusted to fit window frames and shades of various widths and which may also be easily and expeditiously secured to the window-frame and removed therefrom when desired.

With these and other objects in view the invention consists of certain novel features of construction, combination, and arrangement of parts, which will be hereinafter more fully described, and particularly pointed out in the appended claim.

In the accompanying drawings, Figure 1 is a perspective view of the upper portion of a window-frame, showing the bracket applied. Fig. 2 is a longitudinal sectional view through the bracket, and Fig. 3 is a side elevation of the bracket-fastening.

The bracket consists of two telescopic parts $a$ and $b$, each of which is provided at its outer end with a bracket arm or head $c$, shaped to engage the end studs of a shade-roller.

$d$ denotes fastening means—that is, the means for securing the bracket to the window-frame and preventing the accidental shifting of one part of the bracket with respect to the other. The means comprises practically a fastener resembling the well-known form of spring-cotter, the difference, however, being that the limbs $e$ are normally spread apart or divergent, with the lower ends thereof beveled to a sharp edge on their outer sides, so that in driving the fastener into the framework this bevel will tend to tightly close the eye $f$ of the fastening around the telescopic section with which it engages, and thereby prevent sidewise movement of said section, it of course being understood that the eye $f$ when closed has a diameter slightly less than the diameter of either telescopic section, whereby a firm frictional contact is effected. When the fasteners are removed from the framework, they will hang pendent upon the telescopic sections, as the opening therein between the limbs $e$ is not wide enough to permit of the fastener sliding off the telescopic section. Therefore the fastener is always connected to the telescopic section in position to be driven into the framework.

In concluding it might be well to state that the fasteners serve three purposes—first, to secure the brackets to the window-frame; secondly, to secure against endwise movement the telescopic sections of the bracket, and, thirdly, to secure the bracket arm or head $c$ in the ends of the telescopic sections.

From the foregoing description, taken in connection with the accompanying drawings, the construction, mode of operation, and advantage of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

A window-shade bracket, consisting of telescopic sections, bracket-arms fitted in the outer ends of said telescopic sections, and fastenings having eyes to engage each section and frictionally hold the same in adjusted position, and frictionally hold the bracket-arms in the ends of said telescopic sections, said fastenings having attaching means whereby they may be secured to a window-frame, substantially as set forth.

In testimony whereof I have hereunto set my hand in presence of two subscribing witnesses.

EDGAR M. WINFREY.

Witnesses:
SETH N. MAYFIELD,
W. M. MCGREGOR.